United States Patent Office.

SAMUEL BENTZ, OF BOONSBOROUGH, MARYLAND.

IMPROVEMENT IN HULLING WHEAT PREPARATORY TO GRINDING.

Specification forming part of Letters Patent No. 5,777, dated September 19, 1848; antedated March 4, 1848.

*To all whom it may concern:*

Be it known that I, SAMUEL BENTZ, of Boonsborough, Washington county, and State of Maryland, have discovered a mode of separating the bran, skin, or external covering of wheat and rye previous to grinding, which I believe to be new, useful, and practical.

This discovery I denominate "S. Bentz's new and important improvement in preparing wheat and rye for flouring previous to grinding."

From an examination of the wheat-berry it will be found to possess two distinct coverings which are separated by a soft glutinous substance which I denominate the "cuticle." Inclosed beneath these coverings is the mealy part or farina. The external covering, which I denominate the "bran," possesses no nutritious property, but exhibits in a mild form the bitter principle adequate for the purposes of fermentation. This covering runs in parallel lines along the length of the berry, serving as conductors of moisture to excite to life the germ. The interior covering constitutes the fat-forming principle, and incloses the farina in lines that cross at right angles, producing the cellular formation. This covering is both sweet and nutritious, and supplies to the farina beneath it, when pulverized or reduced to flour, its essential strength and flavor. Hitherto this valuable portion of the wheat-berry, in the ordinary mode of flouring, was nearly all lost for human consumption by being separated with the bran. My discovery at once gets rid of that portion which is valueless as food—namely, the bran—with all the filth known to adhere to the outer covering, while it wholly retains the nutritious property of the berry for the support of human life in a clean, healthy, and manageable form. The process by which this result is accomplished is as follows, viz:

In my researches I discovered that the bran or external covering has a strong affinity for moisture, while the internal part of the berry possesses a strong repulsion of moisture. Here, then, I found two principles in philosophy conflicting—attraction and repulsion of moisture in its application to the wheat-berry. The external covering rapidly absorbing until it is thoroughly penetrated by the moisture, and then the inner covering with equal promptitude repelling its further progress for the time being, and thus, while in this peculiar chemical relation, the external covering softened and the inner remaining firm and hard, I apply mechanical force so as to produce a violent attrition of wheat against wheat, as well as against the surfaces of the rubbers or mechanical agents employed, and then the softened covering yielding to the superior friction of the hard surfaces the desirable and important result is obtained—namely, a perfect separation of the bran from the berry without the slightest injury to the form of the berry or the flouring properties of the same—a result which has hitherto baffled the ingenuity of the miller.

The great desideratum in the manufacture of flour has always been to make the greatest possible yield of pure meal to the barrel and avoid the cutting up or grinding the bran with the farina, which, when done, would speck the flour, and thereby lessen its value. It is ascertained that nearly one-fifth of the flour manufactured in the United States is reduced to "fine" on this account, and usually a loss sustained to the manufacturer of fifty cents to the barrel. This is wholly avoided upon my system, the bran being separated from the kernel before grinding the difficulty cannot occur. Superadded to this fact in the thorough removal of the outer covering all other impurities peculiar to that grain are necessarily removed with the bran and a pure healthy state of the berry obtained for flouring. Efforts have been made to avoid the specking of the flour (by grinding up the bran) by the expedient of toughening the wheat by steam, &c., and grinding it with the hull or bran on, to which there are two material objections—first, an increased liability to sour when ground in that state; second, a much greater loss in the yield of flour, as it is a well-known fact that the damper the wheat is when ground the more flour is incorporated with the offal, and if practiced upon will prove ruinous to the miller. My system completely obviates all these difficulties. I first remove or separate the bran from the wheat by the application of moisture in the form of water, vapor, or any other suitable fluid, which the outer coating, as before described, promptly absorbs, and proceeding no further, because a repulsion of moisture then takes place at the inner covering of the berry, and in this condition and at this juncture I cause the wheat to pass between rubbers composed of a revolving and stationary disk of metal or other material, after the manner of millstones, smut-machines, or other suitable form or mode of operation, where it is subjected to the most active and energetic friction of wheat against wheat until the bran (as it will with great rapidity) becomes detached from the berry.

The order in which the several parts of the process is performed is as follows: First, I construct a vapor-chest of suitable size with revolving screens, through which I pass the wheat from the granary. Into this chest I communicate the vapor to the desired extent, which coming in contact with the wheat is readily absorbed by it; or I construct a tight box and by means of a conveyer pass the wheat through a column of water, and when the wheat is sufficiently saturated (from thirty to sixty seconds is sufficient for this purpose) then the wheat is made to pass to the attrition-box, where the moistening process is immediately succeeded by attrition, and when the bran becomes sufficiently disengaged from the wheat it is separated therefrom by a current of atmospheric air. It is then conveyed to a hot-air chamber of similar construction of the vapor-chest with revolving screens, through which the wheat is made to pass to have evaporated any superabundant moisture that may be attached by the introduction of a current of hot air. The wheat may then be subjected to another attrition in its dry state in a similar attrition-box to disengage the small filaments of bran that may still adhere, and after passing through another fanning process it is delivered upon the hopper of the burr in its purest and healthiest form, ready for pulverization.

Some of the advantages that will be derived from my system in preparing wheat for grinding may be stated as follows, viz:

First. All varieties of wheat (white, yellow, and red, &c.) are at once improved from five to fifteen cents per bushel, and the good varieties of yellow and red will make as good and fair meal as the white varieties now do, which ordinarily sell from ten to fifteen cents per bushel higher than the red.

Second. The outer coating being taken off before grinding, all impurities at once are removed, and the brown specula, which detract from the quality of the flour, will not be found.

Third. As a general matter it takes four and a half bushels of wheat, weighing two hundred and seventy pounds, to make a barrel of flour weighing one hundred and ninety-six pounds. Upon this my system nearly all the meal that ordinarily becomes incorporated with the several varieties of offal is saved and put into the barrel and is added to the yield, which is a saving of from forty to fifty-two pounds of wheat over and above the average amount used in every barrel of flour as now manufactured upon the old system.

Fourth. From twenty-five to fifty per cent. of time is saved in grinding upon this system over the ordinary mode and the work done much more evenly and regularly, as the usual difficulty of specking the flour with the bran is entirely obviated, and the contingency of having super flour cut down to fine with common skill in grinding cannot take place.

Fifth. This system will produce the best hot-climate flour known in the world. It is an admitted fact that the bran, which by the common mode of grinding is necessarily, to some extent, incorporated with the meal, is mainly the cause of the flour souring in hot climates.

Sixth. The bolting of the meal from the prepared wheat is done with nearly twice the rapidity it is done in the usual way.

What I claim as my invention or discovery, and desire to secure by Letters Patent, is—

The effectually and practically removing the outer coating of wheat and rye by the process above described before it is submitted to the grinding operation, whether effected in the precise manner and by the exact means herein set forth, or in any other way or by any other means which may be substantially the same.

SAMUEL BENTZ.

Witnesses:
WM. P. ELLIOT,
JOHN L. GEROW.